United States Patent
Huang et al.

(10) Patent No.: US 10,554,103 B2
(45) Date of Patent: Feb. 4, 2020

(54) FLEXIBLE HIGH-POWER CONTROL DEVICE AND MOTOR ASSEMBLY COMPRISING THE CONTROL DEVICE

(71) Applicant: Sentec E&E Co., Ltd., Taoyuan (TW)

(72) Inventors: An-Tai Huang, Taoyuan (TW); Chun-Hung Lin, Taoyuan (TW)

(73) Assignee: SENTEC E&E CO., LTD., Taoyuan (TW)

( * ) Notice: Subject to any disclaimer, the term of this patent is extended or adjusted under 35 U.S.C. 154(b) by 609 days.

(21) Appl. No.: 15/261,871

(22) Filed: Sep. 10, 2016

(65) Prior Publication Data

US 2017/0324309 A1    Nov. 9, 2017

(30) Foreign Application Priority Data

May 6, 2016   (TW) .............................. 105114164 A

(51) Int. Cl.
*H02K 11/33*   (2016.01)
*H02K 5/20*    (2006.01)

(52) U.S. Cl.
CPC ............... *H02K 11/33* (2016.01); *H02K 5/20* (2013.01)

(58) Field of Classification Search
CPC ..................................................... H02K 11/33
See application file for complete search history.

(56) References Cited

FOREIGN PATENT DOCUMENTS

JP    2004-153897    *    5/2004

* cited by examiner

*Primary Examiner* — Ramon M Barrera

(57) ABSTRACT

A flexible high-power control device is disclosed for controlling at least one high-power electrical generating/consuming device which has a plurality of electrical terminals and a housing with a non-planar surface and is thermal-conductively connected to an active cooling unit. The flexible high-power control device comprises a flexible thermal-conductive interfacial insulation substrate, at least one circuit layer, and at least one electronic element. The interfacial insulation substrate is attached to the non-planar surface of the electrical generating/consuming device. The circuit layer, which is disposed on the interfacial insulation substrate, includes a plurality of electrical terminals which are electrically connected to the electrical terminals of the electrical generating/consuming device. The electronic element is electrically mounted on the circuit layer to form a control circuit for controlling the electrical generating/consuming device. Furthermore, a motor assembly is disclosed, which includes at least one high-power motor and at least one flexible high-power control device.

10 Claims, 6 Drawing Sheets

FLEXIBLE HIGH-POWER CONTROL DEVICE AND MOTOR ASSEMBLY COMPRISING THE CONTROL DEVICE

FIELD OF THE INVENTION

The present invention relates to a control device and, more particularly, to a flexible high-power control device that includes a flexible substrate and is capable of controlling a high-power electrical generating/consuming device.

BACKGROUND OF THE INVENTION

Applications of electrical power began in the early 19th century after Michael Faraday, a British physicist, discovered the phenomenon of electromagnetic induction. Up to the late 19th century, various machines, such as the electrical generator produced by Siemens (a German engineer) and the electrical motor invented by Gelam (a Belgian engineer), were gradually developed with the principles of electromagnetic induction, and thus opened the age of machines driven by electrical power.

Electricity has become the most stable and convenient energy that people relies on in daily life. Motors can convert electrical power into mechanical power. As technology advances, the application scope of motor increases. According to a report of International Energy Agency, the electrical consumption of motors and motor-driven equipment occupies nearly half of the global electrical consumption.

In recent years, application of motors focuses on electrical vehicles, the technology of which was researched and used in the middle or later period of 19th century due to easy operation of electrical vehicles. However, due to vehicles of combustion engine advancing in technology more than electrical vehicles, except some electrical vehicles designed for specific purposes, most of electrical vehicles disappeared from the market upon the advent of the 20th century. In the late 20th century, due to the issues of environmental protection and oil crisis, vehicles using fossil fuels are subjected to a great impact. When renewable energy is considered to replace fossil fuels, electrical vehicles using clean energy are under attention. Alternatively, hybrid vehicles are another option for replacing oil-driven vehicles.

According to the experience of developing electrical vehicles, the battery technology occupies about 20-50% of the total cost, and the driving system technology occupies about 10-20% of the total cost. This implies that the driving system will play an important role on the development of electrical vehicles. For an electrical vehicle, the driving system is generally comprised of a motor, a controller, and an inverter/converter. For ease of illustrating the following paragraphs, the controller, inverter, and converter for the driving system of an electrical vehicle are referred to as "control circuits", which can be used in combination by those skilled in the relevant art for satisfying the requirement of an application.

Since the driving system of an electrical vehicle can only use the limited energy stored in the battery, for providing an adequate force for moving the body of the electrical vehicle and allowing the electrical vehicle to have an adequate endurance capacity, an efficient high-voltage AC motor has to be employed. However, an AC motor would generate a lot of heat when converting electrical energy into mechanical energy. In addition, a control circuit would generate a lot of heat when converting a low-voltage direct current, which is supplied from a battery, into a high-voltage alternate current for an AC motor. For a hybrid car or an electrical motorcycle, due to the waste heat generated from operation of the motor or reverse recovery of kinematic energy, the performance and safety of the car or the motorcycle can be influenced. Thus, it is an important topic for a manufacturer of electrical vehicle to develop a vehicle that can effectively dissipate the heat generated in its driving system to reduce the temperature within the vehicle and thus to ensure the driving system to work at a proper temperature.

For easy of illustrating the dissipation problem existing in electrical vehicles, a typical model of a driving system 9 commonly used in a commercial electrical car is shown in FIG. 1. In the driving system 9 of the electrical car, the motor 91 and the control device 93 are made in separate modules and located in different locations, wherein leads 95 are electrically connected between the control device 93 and the motor 91. Furthermore, a cooling device 97 is employed to work with a motor heat sink 971 at the motor 91, and to work with a controller heat sink 973 at the control device 93. However, the driving system 9 is complicated in structure and occupies a lot of space, and this may cause difficulty in assembling components or conducting maintenance and increase the cost. Besides, due to the electrical car consuming a lot of electrical energy, which may range from more than ten kilowatts to several megawatts, and the fact that the electrical leads connected between the power source, the control circuit, and the motor are run through several connection terminals along entire length of the electrical leads, in case one of the connection terminals is loosed or corroded, heat can be released and thus may cause a risk to the electrical car.

In an electrical vehicle, since a motor thereof usually has a cylindrical housing and is provided with an output shaft extending along a central axis between the stators located in the housing, two bearings are required to be respectively installed at the front end and the rear end of the housing to ensure smooth operation of the output shaft. Some manufacturers attempted to locate the control circuit as close to the motor as possible for reducing the electrical transmission loss and saving the space. However, for a water-cooled motor, the locations of the water inlet and the water outlet should be considered carefully to prevent them from interfering with the output shaft of the motor, so that the space can be saved, the structure can be simplified, the efficiency of thermal conduction can be increased, and the length of the electrical leads can be reduced.

In view of the foregoing, the present invention intends to introduce an effective way for dissipating the heat generated in an electrical vehicle, which usually has a limited space, so that the probability of an accident can be reduced, components can be assembled more easily, maintenance can be conducted more easily, and the manufacturing cost can be reduced.

SUMMARY OF THE INVENTION

One object of the present invention is to provide a flexible high-power control device, which can be attached to an outer surface of a high-power electrical generating/consuming device, so as to save the space.

Another object of the present invention is to provide a flexible high-power control device, which can be attached to an outer surface of a high-power electrical generating/consuming device, wherein both the control device and the electrical generating/consuming device share a cooling unit, so that the structure of the electrical generating/consuming device can be simplified, and the economical benefits of the electrical generating/consuming device can be increased.

A further object of the present invention is to provide a flexible high-power control device, which can be attached to an outer surface of a high-power electrical generating/consuming device, whereby a cable electrically connected between the two devices can be shortened, so that the probability of an accident can be reduced.

A still further object of the present invention is to provide a flexible high-power control device, wherein a control circuit thereof is covered with a waterproof layer so as to protect the control circuit from being wetted.

A yet still further object of the present invention is to provide a motor assembly, wherein a motor is attached with a flexible high-power control device to appear as an integral structure, and both devices share a cooling unit, so that the space required for the motor assembly can be saved, the structure of the motor assembly can be simplified, components can be assembled more easily, maintenance can be conducted more easily, the manufacturing cost of the motor assembly can be reduced, and the applicability, safety, and economic benefits of the motor assembly can be increased.

To achieve the above objects, the present invention provides a flexible high-power control device for controlling at least one high-power electrical generating/consuming device which has a plurality of electrical terminals and a housing with a non-planar surface and is thermal-conductively connected to an active cooling unit. The flexible high-power control device comprises a flexible thermal-conductive interfacial insulation substrate, at least one circuit layer, and at least one electronic element. The flexible thermal-conductive interfacial insulation substrate is attached to the non-planar surface of the housing of the high-power electrical generating/consuming device. The circuit layer, which is disposed on the flexible thermal-conductive interfacial insulation substrate, includes a plurality of electrical terminals which at least partially correspond to the electrical terminals of the high-power electrical generating/consuming device and are electrically connected to the associated electrical terminals of the high-power electrical generating/consuming device. The electronic element is electrically mounted on the circuit layer, whereby the electronic element and the circuit layer form a control circuit for controlling the high-power electrical generating/consuming device.

Furthermore, a motor assembly can be obtained by providing the flexible high-power control device of the present invention to at least one high-power motor. The high-power motor, which includes a plurality of electrical terminals and a housing with a non-planar surface, is thermal-conductively connected to an active cooling unit. The flexible high-power control device includes a flexible thermal-conductive interfacial insulation substrate, at least one circuit layer, and at least one electronic element. The flexible thermal-conductive interfacial insulation substrate is attached to the non-planar surface of the housing of the high-power motor. The circuit layer, which is disposed on the flexible thermal-conductive interfacial insulation substrate, includes a plurality of electrical terminals which at least partially correspond to the electrical terminals of the high-power motor and are electrically connected to the associated electrical terminals of the high-power motor. The electronic element is electrically mounted on the circuit layer, whereby the electronic element and the circuit layer form a control circuit for controlling the high-power motor.

In light of the foregoing, each of the flexible high-power control device and the motor assembly of the present invention allows a motor to be attached with a control device to appear as an integral structure, so that the space can be saved, and the electrical transmission loss can be reduced significantly, and thus the probability of an accident can be reduced. Furthermore, both the control device and the motor share a cooling unit, so that the structure can be simplified, components can be assembled more easily, maintenance can be conducted more easily, and the manufacturing cost can be reduced. In addition, with an intelligent control unit, various control mechanisms concerning protection, detection and feedback can be provided, so that the applicability, safety, economical benefits, and water resistance of a driving system of an electrical vehicle can be increased.

BRIEF DESCRIPTION OF THE DRAWINGS

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

The foregoing and other technical contents, features and advantages of the present invention will be illustrated in detail by way of exemplary embodiments with reference to the accompanying drawings. In the exemplary embodiments, same elements will be indicated by similar numerals or labels.

Figure 1:
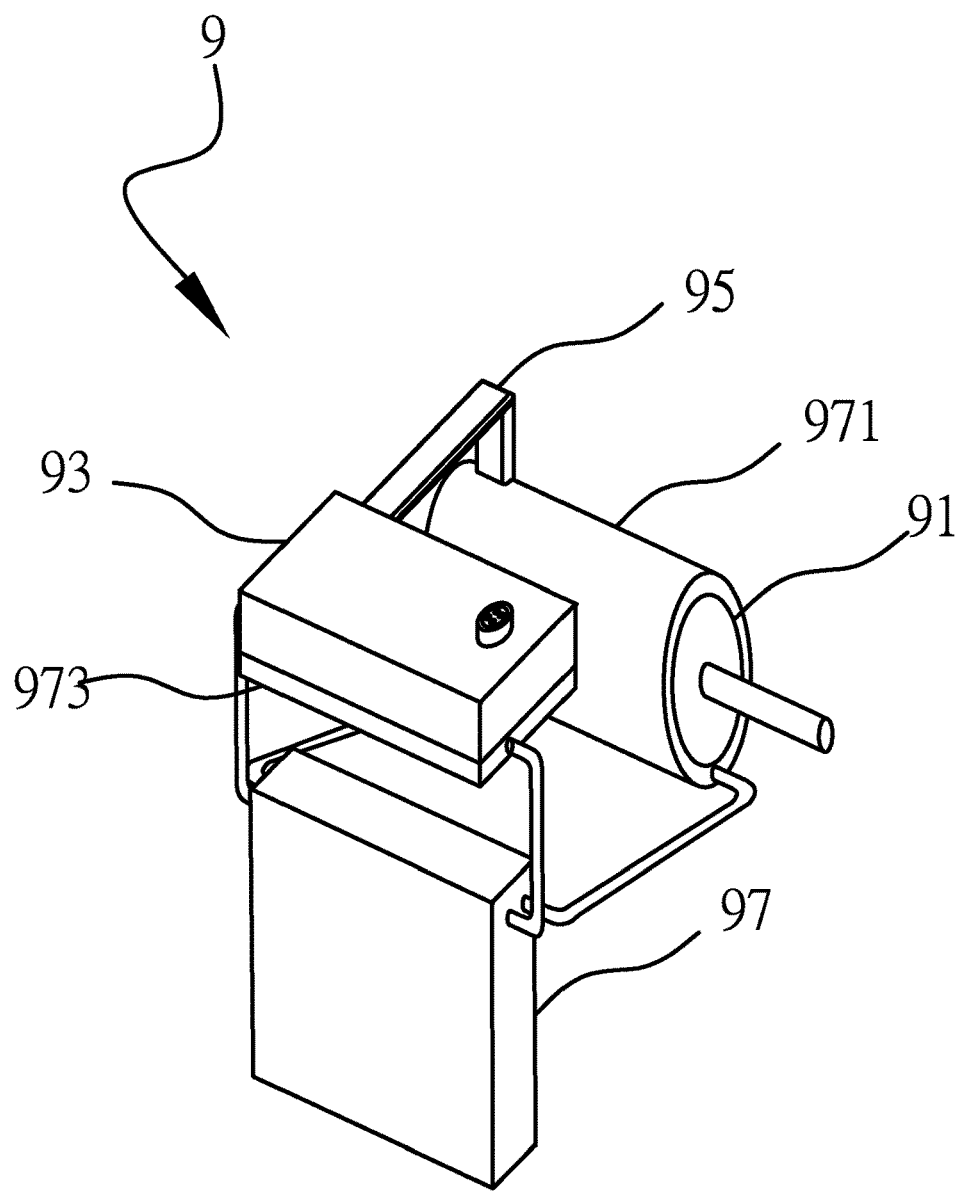
FIG. 1 shows a schematic view of a prior art of a driving system including a motor and a control device.
Figure 2:
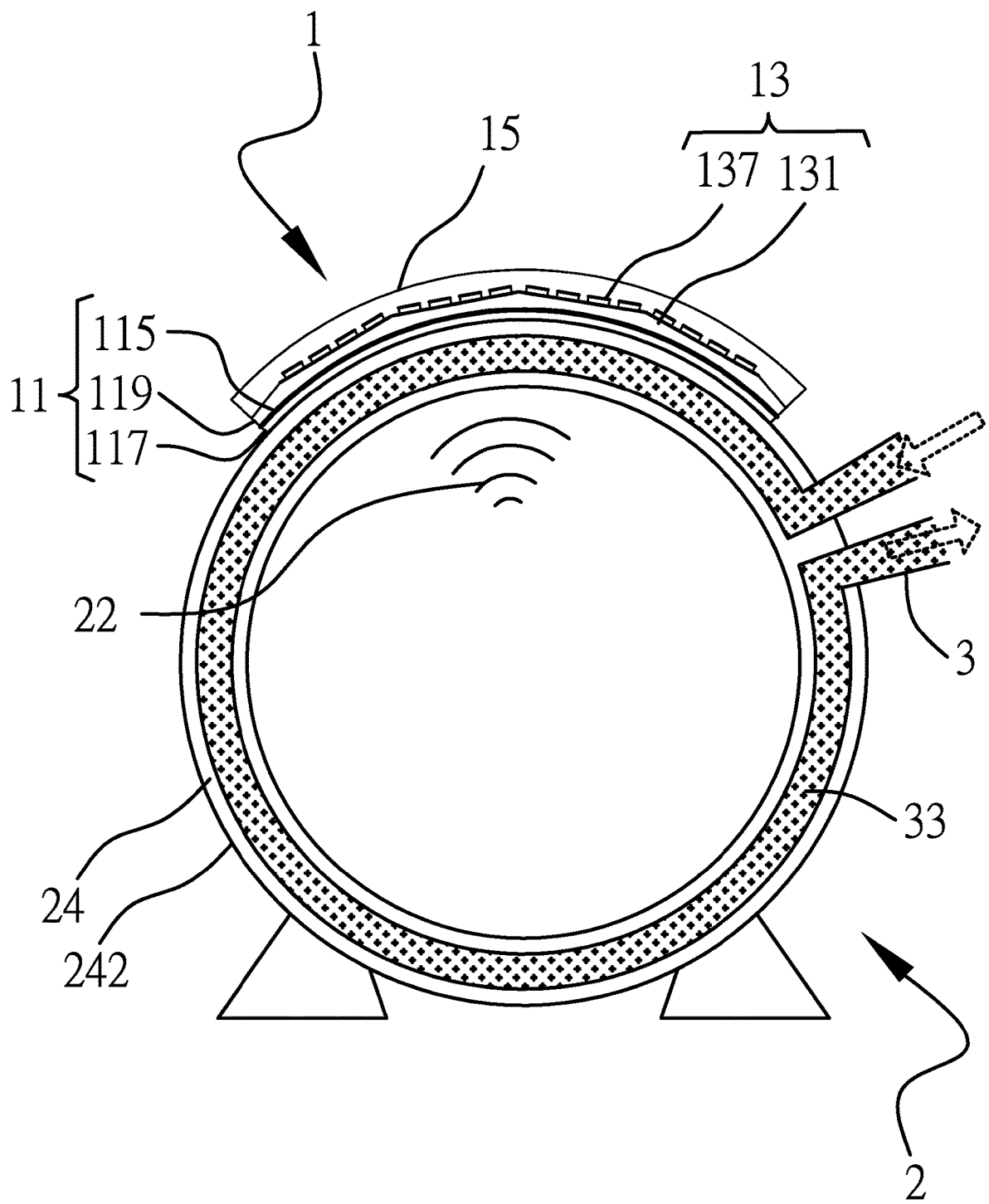
FIG. 2 shows a schematically sectional view of a motor assembly according to a first embodiment of the present invention, including a flexible high-power control device and a motor regulated by the control device.

FIG. 2 shows a motor assembly according to a first embodiment of the present invention, which generally comprises a flexible high-power control device 1 and a high-power motor 2. The term "high-power motor" refers to a driving device used in an electrical car or bus, electrical boat, or other vehicles, which consumes electrical power in the range of several kilowatts to several megawatts. Of course, those skilled in the relevant art may know that the flexible high-power control device of the present invention is not used only for controlling a high-power motor, but also for controlling a device that generates electrical power. As an example, a motor used in an electrical car can work as a generator during a braking process of the car for reclaiming the kinetic energy of the car. Thus, in this specification, the target device that can be regulated by the flexible high-power control device of the present invention is referred to as a high-power electrical generating/consuming device.

The high-power motor 2 is thermal-conductively connected to an active cooling unit 3, such as a liquid cooling unit containing a coolant 33 which can be introduced into the housing 24 of the high-power motor by using an external pump (not shown) to take away the heat 31 generated from the rotation of the rotor of the motor and from the electrical conduction. In this embodiment, the housing 24 of the high-power motor 2 has a substantially circular surface 242, which is termed a "non-planar surface" in this specification. Furthermore, the high-power motor 2 includes a plurality of electrical terminals 26 for being connected to an electrical source.

Figure 3:
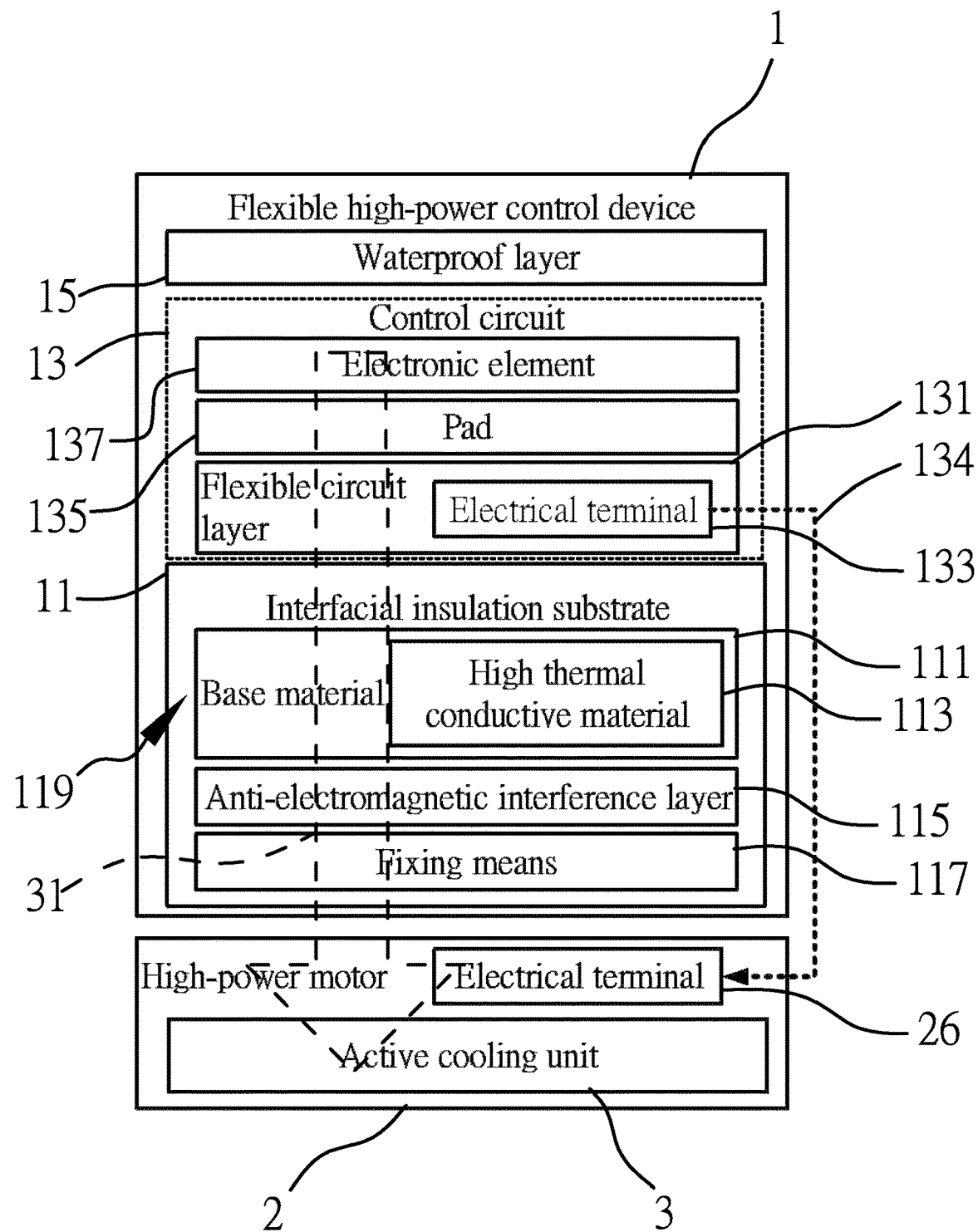
FIG. 3 shows a diagram for illustrating the arrangement of various components of the motor assembly of the first embodiment, and the electrical and thermal conduction.

Referring to FIG. 2 in conjunction with FIG. 3, the high-power control device 1 includes a flexible, thermal-conductive, interfacial insulation substrate 11, which includes a blended layer 119, an anti-electromagnetic interference layer 115, and a fixing means 117. The blended layer 119 is made by adding a high thermal conductive material 113, such as boron nitride (BN) powder having a thermal conductivity of about 250 W/mK, to a base material 111, such as a thermal silicone, which has sufficient adhesion and flexibility to securely hold the BN powder therein. The high thermal conductive material 113 can increase the thermal conduction of the blended layer 119. Under the blended layer 119 is provided the anti-electromagnetic interference layer 115. In this embodiment, the anti-electromagnetic interference layer 115 is made of grapheme, which has an extremely low resistance of about $10^{-6}$ Ω·cm and a high thermal conductivity of about 4800 W/mK. During operation of the high-power motor 2, the anti-electromagnetic interference layer 115 can reduce the interference of electromagnetic radiation, without functioning as a barrier that hinders heat transfer. Under the anti-electromagnetic interference layer 115 is provided the fixing means 117, which is a thermal adhesive layer that has a thermal conductivity of about 2 W/mK and provides adequate bonding strength to fix the interfacial insulation substrate 11 onto the non-planar surface 242 of the housing 24 of the high-power motor 2, so that the interfacial insulation substrate 11 can endure vibration while the motor is running.

On the interfacial insulation substrate 11 is provided a flexible circuit layer 131, which can be obtained by etching a copper foil, includes a plurality of electrical terminals 133 capable of being electrically connected to the electrical terminals 26 of the high-power motor 2, and includes a plurality of pads 135 formed thereon for mounting at least one electrical element 137 on the flexible circuit layer 131 to form a control circuit 13 for controlling the operation of the high-power motor 2. In addition, for protecting the control circuit 13 from being wetted or contaminated, the control circuit 13 is covered with a waterproof layer 15.

The control circuit 13 of the flexible high-power control device 1 allows a direct current supplied from a battery (not shown) to be converted into an alternate current 134. During the conversion of electrical current, heat 31 can be generated by the control device and thus the temperature of the ambient environment of the control circuit 13 can be increased. The alternate current 134 can flow into the high-power motor 2 via the electrical terminals 133 of the control circuit 13 and the electrical terminals 26 of the high-power motor 2. Furthermore, during operation of the high-power motor 2, electromagnetic noise 22 and a large amount of heat can be generated by the motor, and this can increase the temperature of the high-power motor 2.

The cooling unit 3 mounted around the high-power motor 2 can introduce the coolant 33 into a passage inside the motor's housing 24 to take away the heat generated in the motor, so that the rotor and stator inside the motor (not shown) can be cooled down. Furthermore, the motor's housing 24 allows the heat generated from the control circuit 13 to be transferred to the coolant 33 of the cooling unit 3 via the interfacial insulation substrate 11. As such, the heat generated by the high-power motor 2 and the heat generated from the control circuit 13 can be dissipated through the coolant 33 of the cooling unit 3, so that each of the high-voltage motor 2 and the control circuit 13 can maintain a proper working temperature to achieve a best performance.

The anti-electromagnetic interference layer 115, made of graphene, is worked as a barrier for blocking the electromagnetic noise 22 generated from operation of the high-power motor 2, to protect various electronic equipment around the motor, especially the control circuit 13, which is close to the high-power motor 2. In addition, since the control circuit 13 is close to the high-power motor 2, the heat generated from the control circuit 13 due to an unnecessary length of a cable causing an increased resistance, as commonly seen in conventional technology, can be reduced significantly. Thus, the safety and reliability of an electrical vehicle employing the technology of the present invention can be increased.

Of course, those skilled in the relevant art may know that the active cooling unit 3 can be a device using other cooling techniques, such as cooling by combination of conduction and convention, fan cooling, heat pipe cooling, semiconductor cooling, and so on; the anti-electromagnetic interference layer 115 can be made of metal film or metal mesh instead of graphene film; the fixing means 117 can be screws or rivets, instead of the thermal adhesive, to fix the interfacial insulation substrate 11 onto the motor' housing 24; the base material 111 can be added with other high thermal conductive materials, such as aluminum oxide powder, beryllium oxide powder or the like, instead of the BN powder; the flexible circuit layer 131 can be made using alloy material, such as alloy made from copper, aluminum, silver or the like, instead of copper foil. The above embodiment is used for illustrating various features of the present invention, but for limiting the scope of the present invention.

Figure 4:
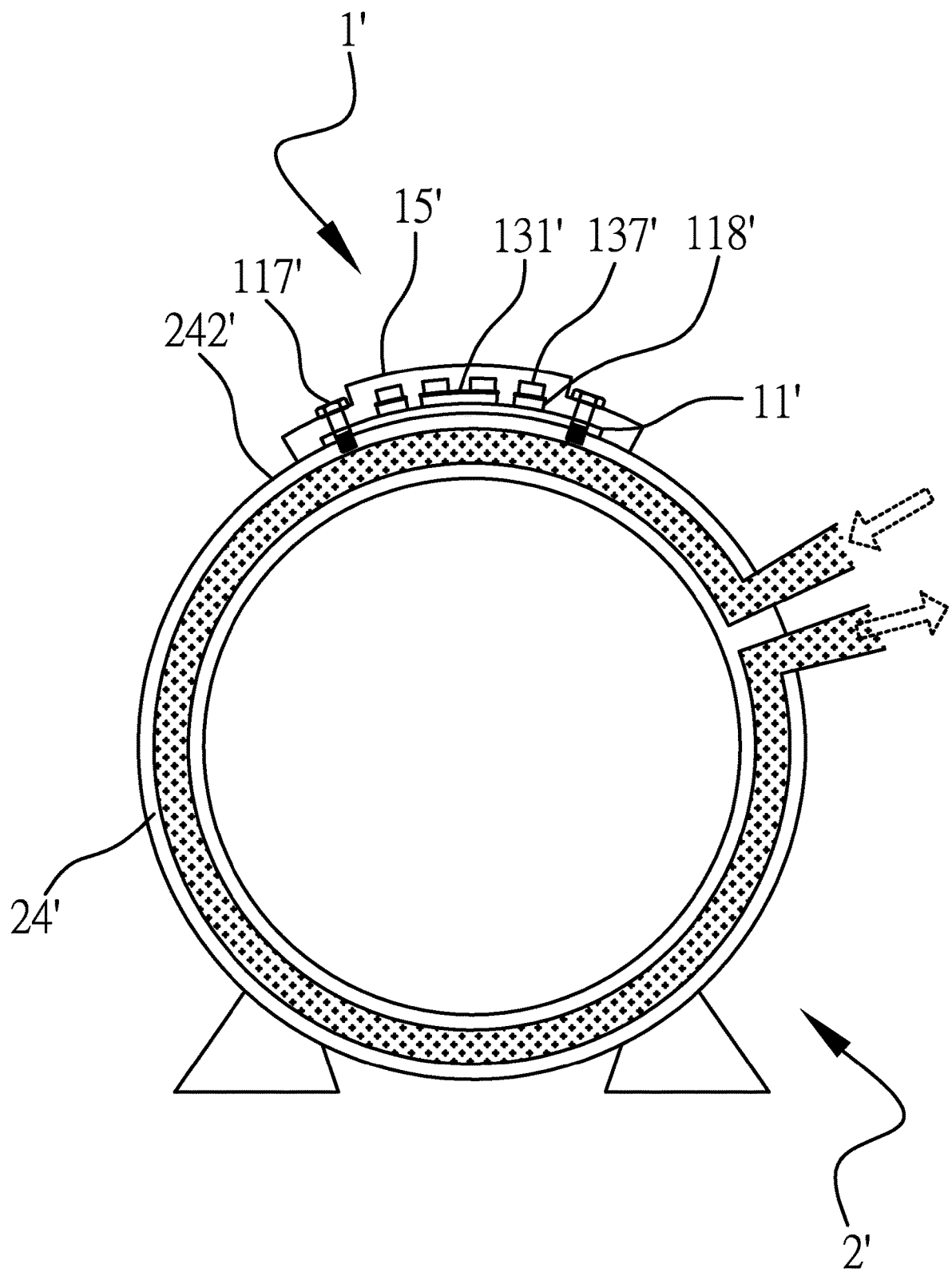
FIG. 4 shows a schematically sectional view of a motor assembly according to a second embodiment of the present invention, including a flexible high-power control device and a motor regulated by the control device.
Figure 5:
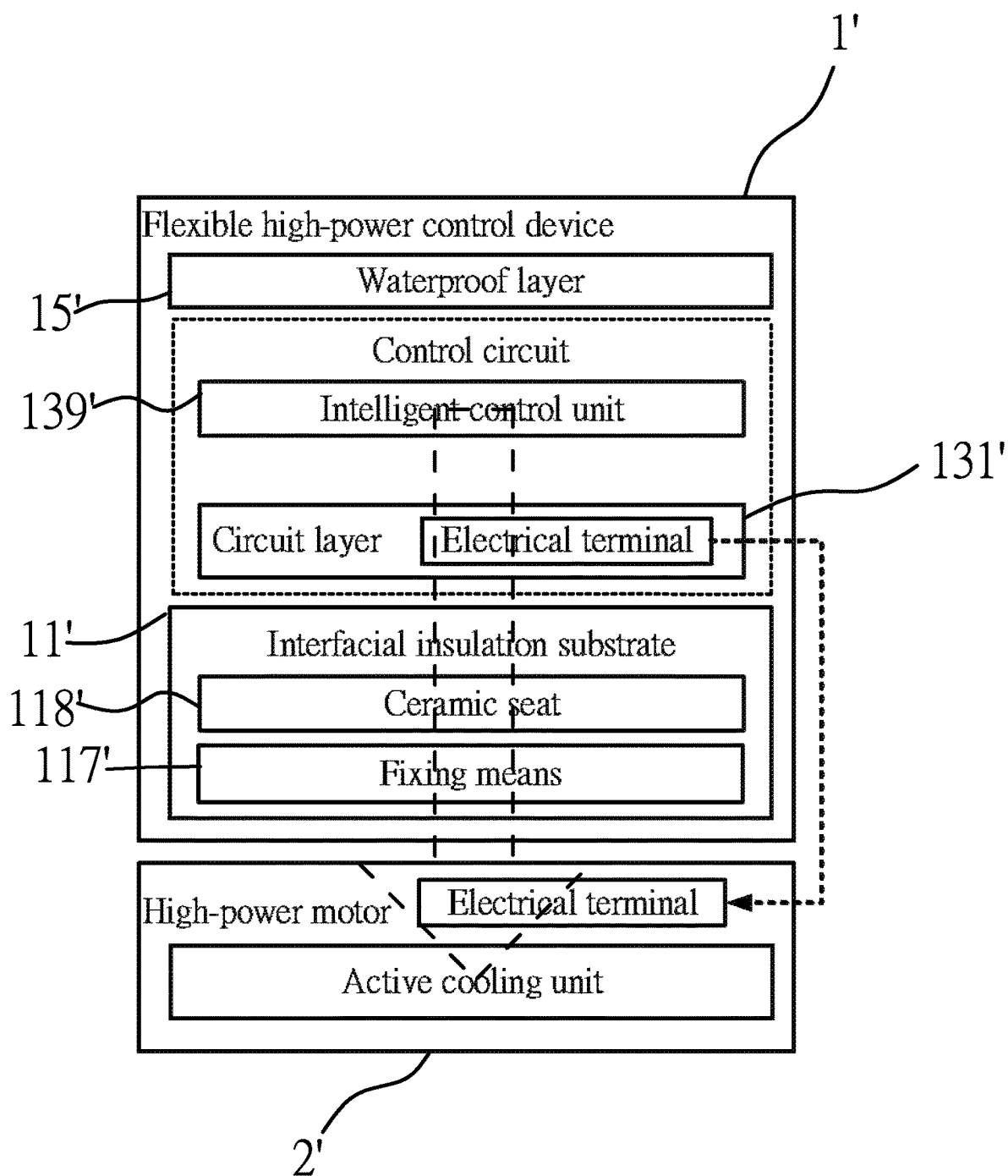
FIG. 5 shows a diagram for illustrating the arrangement of various components of the motor assembly of the second embodiment.

FIGS. 4 and 5 show a second embodiment of the present invention, which is similar to the first embodiment in some aspects, and thus only the portions with different features will be illustrated in the following paragraphs. In the second embodiment, the flexible high-power control device 1' includes a flexible, thermal-conductive, interfacial insulation substrate 11', which is made in the form of an aluminum foil plate, on which an aluminum oxide insulation film (not shown) is formed by using an anodic treatment. The fixing means 117' is made in the form of screws, which can fix the aluminum foil plate 11' onto the non-planar surface 242' of the high-power motor 2'.

On the interfacial insulation substrate 11' is provided at least one ceramic seat 118', on which one circuit layer 131' is provided. The circuit layer 131', which has copper traces formed by sputtering or plating, allows one or more electronic elements 137' to be mounted on its top surface. The electronic elements 137' may include a built-in microprocessor (not shown) and one or more relays (not shown), combination of which may constitute an intelligent control unit 139' that provides various control mechanisms concerning protection, detection, and feedback, in addition to the function of converting electrical power, so that the high-power motor 2' can be operated more safely while consuming less electrical power. Similarly, the intelligent control unit 139' is covered with a waterproof layer 15' to protect it from being wetted or contaminated.

Figure 6:
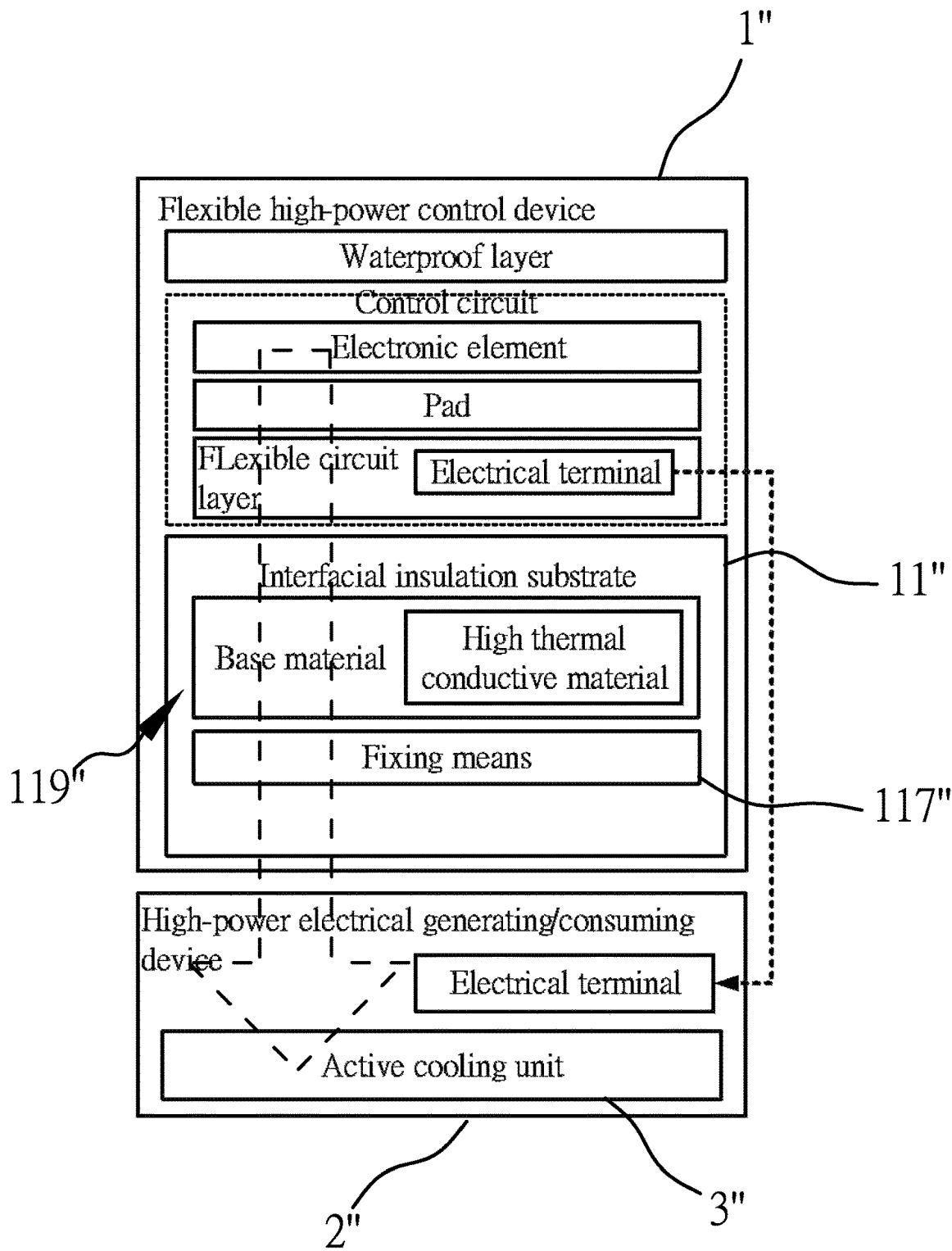
FIG. 6 shows a diagram of a third embodiment.

FIG. 6 shows a third embodiment of the present invention, wherein a flexible high-power control device 1" is applied to a high-power LED for use in streetlights, which is regarded as a high-power electrical generating/consuming device 2".

Since most of components of the third embodiment are similar to those of the previous embodiments, the following paragraph will illustrate the portions with different features in more detail.

For a high-power LED, due to the fact that 20% of the consumed electrical energy is transformed into light while 80% of the electrical energy is transformed into heat, the temperature of the LED is increased significantly, and this leads to a decrease of the life span of the LED and a decrease of the efficiency of emitting light. To solve this problem, manufacturers usually install a fan for an LED, which works with the original fin block of the LED, wherein the fan can generate an air current to speed up the heat dissipation for the LED. In this embodiment, the active cooling unit 3", which is comprised of a fan and a fin block (not shown), is applied to the high-power LED 2", wherein the interfacial insulation substrate 11" is composed of the blended layer 119" and a fixing means 117" which is in the form of a thermal adhesive layer. The interfacial insulation substrate 11" can be disposed on one surface of the fin block, with the thermal adhesive layer 117" located between the blended layer 119" and the fin block. It is obvious that the control device 1" can be applied to the high-power LED 2" easily and economically.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. A flexible high-power control device for controlling at least one high-power electrical generating/consuming device which has a plurality of electrical terminals and a housing with a non-planar surface and is thermal-conductively connected to an active cooling unit, the flexible high-power control device comprising:
    a flexible, thermal-conductive, interfacial insulation substrate attached to the non-planar surface of the housing of the high-power electrical generating/consuming device;
    at least one circuit layer disposed on the flexible, thermal-conductive, interfacial insulation substrate, the circuit layer including a plurality of electrical terminals which at least partially correspond to the electrical terminals of the high-power electrical generating/consuming device and are electrically connected to the associated electrical terminals of the high-power electrical generating/consuming device; and
    at least one electronic element electrically mounted on the circuit layer, whereby the electronic element and the circuit layer form a control circuit for controlling the high-power electrical generating/consuming device.

2. The flexible high-power control device of claim 1, wherein the flexible, thermal-conductive, interfacial insulation substrate includes a blended layer, which is obtained by adding a high thermal conductive material to a flexible base material, the high thermal conductive material having a thermal conductivity greater than a predetermined value.

3. The flexible high-power control device of claim 2, wherein the flexible, thermal-conductive, interfacial insulation substrate further includes a fixing means, so that the control circuit can be fixed onto the non-planar surface of the housing.

4. The flexible high-power control device of claim 3, wherein the circuit layer is flexible, and the flexible, thermal-conductive, interfacial insulation substrate further includes an anti-electromagnetic interference layer disposed on one surface opposite to the flexible circuit layer.

5. The flexible high-power control device of claim 1, further comprising a waterproof layer for covering the control circuit.

6. A motor assembly comprising:
    at least one high-power motor, which includes a plurality of electrical terminals and a housing with a non-planar surface and is thermal-conductively connected to an active cooling unit; and
    at least one flexible high-power control device, which includes:
    a flexible, thermal-conductive, interfacial insulation substrate attached to the non-planar surface of the housing of the high-power motor;
    at least one circuit layer disposed on the flexible, thermal-conductive, interfacial insulation substrate, the circuit layer including a plurality of electrical terminals which at least partially correspond to the electrical terminals of the high-power motor and are electrically connected to the associated electrical terminals of the high-power motor; and
    at least one electronic element electrically mounted on the circuit layer, whereby the electronic element and the circuit layer form a control circuit for controlling the high-power motor.

7. The motor assembly of claim 6, wherein the control circuit includes an intelligent control unit.

8. The motor assembly of claim 6, wherein the flexible, thermal-conductive, interfacial insulation substrate includes a blended layer containing a high thermal conductive material having a thermal conductivity greater than a predetermined value.

9. The motor assembly of claim 6, wherein the circuit layer is flexible; the high-power control device further includes a waterproof layer for covering the control circuit; the flexible, thermal-conductive, interfacial insulation substrate further includes an anti-electromagnetic interference layer disposed on one surface opposite to the flexible circuit layer, and a fixing means for being attached to the non-planer surface of the housing more easily.

10. The motor assembly of claim 6, wherein the active cooling unit is a liquid cooling unit.

* * * * *